United States Patent
Rufer et al.

(10) Patent No.: US 7,180,270 B2
(45) Date of Patent: Feb. 20, 2007

(54) FREQUENCY CONVERTER FOR HIGH-SPEED GENERATORS

(75) Inventors: Alfred Rufer, Villars-sous-Yens (CH); Martin Veenstra, Lausanne (CH)

(73) Assignee: Alstom Technology Ltd., Baden (CH)

(*) Notice: Subject to any disclaimer, the term of this patent is extended or adjusted under 35 U.S.C. 154(b) by 0 days.

(21) Appl. No.: 11/324,890

(22) Filed: Jan. 4, 2006

(65) Prior Publication Data

US 2006/0214645 A1 Sep. 28, 2006

Related U.S. Application Data

(63) Continuation of application No. PCT/EP04/51353, filed on Jul. 5, 2004.

(30) Foreign Application Priority Data

Jul. 5, 2003 (DE) .............................. 103 30 473

(51) Int. Cl.
*H02P 9/44* (2006.01)

(52) U.S. Cl. ................... 322/20; 322/25; 322/28; 322/37; 363/127; 363/89; 290/44

(58) Field of Classification Search ............. 322/19, 322/20, 22, 28, 37; 363/76, 89, 127
See application file for complete search history.

(56) References Cited

U.S. PATENT DOCUMENTS 4,800,481 A * 1/1989 Knafll et al. .................. 363/70
4,904,920 A * 2/1990 Rufer .......................... 318/800
4,956,598 A 9/1990 Recker et al. ................. 322/28
5,031,086 A 7/1991 Dhyanchand et al. ......... 363/37

(Continued)

FOREIGN PATENT DOCUMENTS

DE 101 56 694 6/2003

(Continued)

OTHER PUBLICATIONS

Carlos Veganzones Nicolas et al.: Guidelines for the Design and Control of Electrical Generator Systems for new Grid connected Wind Turbine Generators, 28th Annual Conference of the IEEE, vol. 4, Nov. 5-8, 2002, pp. 3317-3325.

(Continued)

*Primary Examiner*—Nicholas Ponomarenko
(74) *Attorney, Agent, or Firm*—Darby & Darby

(57) ABSTRACT

The present invention relates to a method and to a device for adapting the alternating current generated by a generator (1) and the alternating voltage generated by a generator (1) to a grid (8), whereby the generator (1) has at least one excitation coil (2). The power fed into the grid (8) can be flexibly adapted while entailing low switching losses in that a static frequency converter (9) is employed for the adaptation between the generator (1) and the grid (8), and in that, in order to control the power fed into the grid (8), means (3) are provided with which, on the one hand, the strength of the excitation field generated by the at least one excitation coil (2) is regulated and, on the other hand, the phase angle between the frequency converter voltage and the generator or grid voltage is appropriately controlled.

16 Claims, 3 Drawing Sheets

U.S. PATENT DOCUMENTS

| | | | | |
|---|---|---|---|---|
| 5,225,712 | A * | 7/1993 | Erdman | 290/44 |
| 5,387,859 | A * | 2/1995 | Murugan et al. | 322/10 |
| 5,585,708 | A * | 12/1996 | Richardson et al. | 318/800 |
| 5,594,636 | A | 1/1997 | Schauder | 363/160 |
| 5,798,631 | A * | 8/1998 | Spee et al. | 322/25 |
| 6,020,713 | A | 2/2000 | Geis et al. | 318/801 |
| 6,208,120 | B1 * | 3/2001 | Gibbs | 322/59 |
| 6,459,596 | B1 | 10/2002 | Corzine | 363/37 |
| 6,487,096 | B1 * | 11/2002 | Gilbreth et al. | 363/35 |
| 6,567,278 | B2 * | 5/2003 | Rufer et al. | 363/17 |
| 6,621,719 | B2 * | 9/2003 | Steimer et al. | 363/43 |
| 6,750,633 | B2 | 6/2004 | Schreiber | 322/12 |
| 6,853,094 | B2 * | 2/2005 | Feddersen et al. | 290/44 |
| 6,856,038 | B2 * | 2/2005 | Rebsdorf et al. | 290/44 |
| 7,095,130 | B2 * | 8/2006 | Ichinose et al. | 290/44 |
| 7,102,247 | B2 * | 9/2006 | Feddersen | 290/44 |
| 2003/0057923 | A1 | 3/2003 | Hofstetter et al. | 322/24 |
| 2004/0119292 | A1 | 6/2004 | Datta et al. | 290/44 |

FOREIGN PATENT DOCUMENTS

| | | |
|---|---|---|
| EP | 0 273 598 | 7/1988 |
| EP | 1 276 224 | 1/2003 |
| WO | WO 03/008802 | 1/2003 |

OTHER PUBLICATIONS

Nikolaus P. Schibli et al.: A Three-Phase Multilevel Converter for High-Power Induction Motors, IEEE Transactions on Power Electronics, vol. 13, No. 5, Sep. 1998, pp. 978-986.

Ta Rae et al.: "Controller Structure and Design of Firing Angle Controllers for (Unit Connected) HVDV Systems", IEEE AFRICON 4th, vol. 2, Sep. 24-27, 1996, pp. 856-863.

Hansruedi Buehler: "Convertisseurs statiques", Presses Polytechniques et Universitaires Romandes, Collection Électricité, pp. 147-152, 222-225, and 302-305 (plus two cover pages), discussed on p. 5 of the specification of application.

* cited by examiner

FREQUENCY CONVERTER FOR HIGH-SPEED GENERATORS

This application is a continuation of International Patent Application No. PCT/EP04/51353, filed on Jul. 5, 2004, which claims priority to German Patent Application No. DE 103 30 473.8, filed on Jul. 5, 2003.

FIELD OF THE INVENTION

The present invention relates to a method for adapting the alternating current generated by a generator and the alternating voltage generated by a generator to a grid, whereby the generator is a generator having at least one excitation coil. Moreover, the present invention relates to a device for carrying out such a method.

DESCRIPTION OF THE PRIOR ART BACKGROUND

Variable-speed generators or, generally speaking, generators having a frequency that diverges from the grid frequency are typically connected to the electrical power grid by means of converters that adapt the voltage and the frequency being generated by the generator to the voltage and the frequency of the electrical power grid. Various devices are used as converters for this purpose such as, for instance, so-called direct converters, with which the two different voltages and frequencies are adjusted relative to each other, for example, using semiconductor switches (e.g. thyristors or gate turn-off thyristors—GTOs) in a direct conversion (AC/AC). Such direct converters exist, for instance, as so-called cycloconverters or as so-called matrix converters (described, for example, in U.S. Pat. No. 5,594,636). In the case of a natural commutation, they generate frequency components of a low-frequency that are undesired and difficult to eliminate, while in the case of forced commutation, they entail large switching losses.

As an alternative, it is possible to ensure a voltage-adapted and frequency-adapted connection of a generator to an electrical power grid in the form of an indirect conversion. With such a conversion, first of all, a rectifier produces a direct current from the alternating current generated by the generator and, in an inverter, this direct current is subsequently matched to the voltage and frequency of the electrical power grid. Such controlled converters likewise make use of semiconductor switches (for instance, GTOs, insulated gate bipolar transistors—IGBTs, metal oxide semiconductor field-effect transistors—MOSFETs, or integrated gate commutated thyristors—IGCTs) and they entail large switching losses at the switching frequencies typically employed.

SUMMARY OF THE INVENTION

Therefore an objective of the present invention is to put forward a simple and flexible method that is characterized by low switching losses and that serves to adapt the alternating current generated by a generator and the alternating voltage generated by a generator to a grid. This method is used in conjunction with a generator having at least one excitation coil.

The present invention provides a method for adapting the alternating current generated by a generator and the alternating voltage generated by a generator to a grid, whereby the generator is a generator having at least one excitation coil, wherein a static frequency converter is used for the adaptation between the generator and the grid and in that, in order to control the power fed into the grid, means are provided with which, on the one hand, the strength of the excitation field generated by the at least one excitation coil is regulated and, on the other hand, the phase angle between the frequency converter voltage and the generator or grid voltage is appropriately controlled.

An aspect of the present invention consists of utilizing the advantages that are typically associated with the use of static frequency converters, namely, simple structure, low switching losses, etc., without having to put up with their disadvantages. A major drawback of static frequency converters is the fact that, even though they allow the frequency to be converted between the input and the output, they typically do not permit a simple regulation of the ratio of the amplitude of the alternating voltage between the input and the output. This drawback has now been overcome in a surprisingly simple manner in that, in order to regulate the power fed into the grid by the generator, on the one hand, the excitation field of the excitation coil of the generator and, on the other hand, the phase angle between the voltage generated by the controlled rectifier and the generator voltage are appropriately regulated.

The proposed circuit or proposed method has the additional advantage that, in a simple manner, when the turbine-generator group is started up, it allows the latter to be accelerated to the requisite minimum speed. Thermal or other sources of energy such as gas turbines cannot generate any torque at low speeds. Before they can produce power, they first have to be brought up to a minimum speed by means of a motor. In the case of the "turbine-gear-generator-grid" solution, the generator can only be operated synchronously to the grid, that is to say, at the rated speed, and an additional starting motor with its own supply and control mechanisms (state of the art) is needed.

In the case of the "turbine-generator-converter-grid" solution, the additional starting devices can be dispensed with if the converter can accelerate the generator together with the turbine. In order to do so, the following is necessary:

1) energy has to be able to flow from the grid via the converter to the generator;
2) the converter has to be able to generate any desired voltage and frequency on the generator side. In generators, the voltage and the frequency are approximately proportional to the speed (at a constant excitation). Therefore, in order to accelerate from a standstill to the rated speed, the voltage and the frequency also have to be changed from zero to the rated value.

The proposed circuit is very suitable for the acceleration procedure. In a simple manner, it can generate any desired voltages or frequencies by being operated at higher switching frequencies. The higher losses associated with this mode of operation only occur during start-up, which is permissible since this is only of short duration and since typically, similar losses occur in a dedicated starting device as well. As soon as the speed range of energy production has been reached, the system switches over to the low-loss basic frequency clocking.

Therefore, with this circuit, the costs for an additional starting device can be saved.

According to a first preferred embodiment of the present method, the static frequency converter employed is an indirect frequency converter. In other words, it is a static frequency converter configured as a rectifier/inverter with a direct current stage installed in-between. This simple design—which is normally associated with high switching losses when there is additionally a need to variably adjust the ratio of the voltages between the input and the output by means of a specific switching of the rectifier or inverter—can be achieved without complex measures by using the inventive regulation of the excitation field and by using the phase angle of the voltages generated by the frequency converter.

Another preferred embodiment of the method according to the invention is characterized in that the adaptation is carried out by means of a static frequency converter with a controlled rectifier in basic frequency clocking and/or with a controlled inverter in basic frequency clocking. The method is especially advantageous when both the rectifier and the inverter are configured as controlled components in basic frequency clocking. The use of two pulse inverters arranged in mirror image so to speak is particularly simple and, owing to the inventive actuation of the excitation coil, is also possible for generators that have to be dynamically controlled in terms of their power connection to the grid.

Two-stage converters or three-stage converters can be employed for the rectifier as well as for the inverter. Three-stage converters are preferred in the case of a generator having only one group of stator windings while two-stage and three-stage converters are very well-suited in the case of multiple groups of windings. Preferably, the controlled rectifier is a three-stage rectifier. As an alternative or at the same time, the controlled inverters are three-stage inverters. In this context, both are preferably operated in basic frequency clocking. The general mode of operation of such three-stage inverters is known to the person skilled in the art and can be found in the standard literature, for example, in "Convertisseurs statiques", Hansruedi Bühler, published by Presses Polytechniques et Universitaires Romandes, 1991.

Such a method according to the invention is preferably realized in that a central control unit is provided which, by measuring the voltage and/or current strength upstream and/or downstream from the static frequency converter, carries out an adaptation of the amplitude of the alternating current fed into the grid by appropriately actuating the means for controlling the strength of the excitation field generated by the excitation coil.

The central control unit also establishes a suitable phase angle between 1) the generator voltage and the voltage generated by the controlled rectifier, and
2) the grid voltage and the voltage generated by the controlled inverter, in order to permit the desired power flow with the desired power factors.

The effective power is determined primarily by the angle, while the reactive power (and thus the power factor) is determined by the amplitude.

The frequency components that might occur outside of the actual desired basic frequency on the generator side of the static frequency converter as well as on the grid side of the static frequency converter can be reduced or even completely eliminated by arranging appropriate filter elements on one or both sides. Examples of these are band-pass filters, high-pass filters or low-pass filters, or else combinations of such filters. These can also be active or passive structural elements.

The method according to the invention can be carried out not only with generators having a group of stator windings but, by the same token, with generators having two or more groups of windings. Accordingly, the groups thus formed, each having three phases, are each converted by individual static frequency converters. For example, in the case of a generator with two groups of stator windings, preferably the connection to the grid is established downstream from the static frequency converter by means of a transformer with which the one group having three phases is arranged in a star connection and the other group having three phases is arranged in a delta connection.

Moreover, the present invention relates to a device for carrying out a method as described above. The device preferably comprises a generator having at least one excitation coil that can be regulated by means for adapting the amplitude of the alternating current to the requirements of the grid, having a static frequency converter encompassing at least one controlled rectifier in basic frequency clocking and at least one controlled inverter in basic frequency clocking and also having at least one control unit to control these elements.

Additional preferred embodiments of the device according to the invention are described in the dependent claims.

BRIEF DESCRIPTION OF THE DRAWINGS

The invention will be explained in greater depth below on the basis of embodiments in conjunction with the drawings. The following is shown.

DETAILED DESCRIPTION

Many power generation systems make use of thermal or other sources of energy such as gas turbines as the source of power. Typically, such sources of power are characterized by fast rotational speeds and thus by high operating frequencies as well as by the possibility of changing the rotational speed in order to make an adaptation to the power demand.

Figure 1:
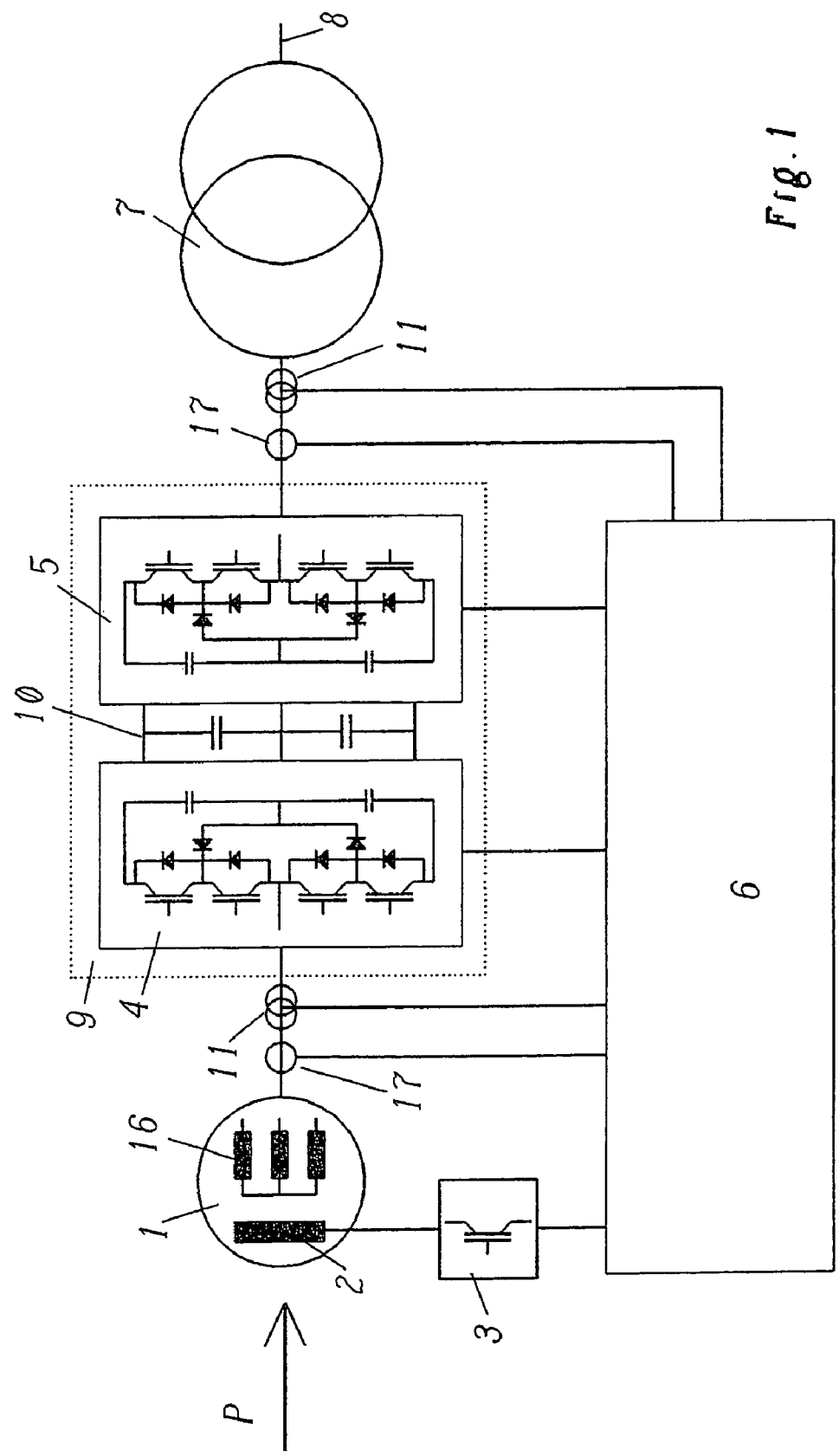
FIG. 1 a schematic depiction of the connection of a generator to an electrical power grid.

In order to take into account the various rotational speeds of the energy generator, which is symbolically represented, for example, in FIG. 1 by the reference letter P, gears, for instance, can be employed between the actual power source P and the generator for generating electric power. Such gears, however, normally have the drawback that they entail high losses and require a great deal of maintenance. Since the rotational frequency of the generator ultimately determines the frequency of the alternating current that is generated with it, as an alternative, it is also possible to connect the generator directly to the source of power, if applicable, via a coupling mechanism, and subsequently, downstream from the generator, to adapt the frequency of the generated current to the grid frequency by providing a frequency converter. Even though such a frequency converter avoids the mechanical losses that occur with gears, it usually causes energy losses due to the switching or commutation behavior of the semiconductor components used therein.

FIG. 1 shows a schematic depiction of a current generator and its connection to a grid 8 with which such losses can be kept to a minimum and nevertheless differing rotational speeds of the generator are possible without the need for mechanical gears.

The system comprises a generator 1 in which a rotating excitation coil 2 induces a corresponding alternating current in the stator windings 16. Here, the rotation of the excitation coil 2 is effectuated by a source of power P that can be a gas turbine or else a water turbine or another kinetic source of energy.

The current passed through the excitation coil 2 can be adjusted as a function of the requirements by regulating means 3 that are actuated by a control unit 6. Regulating means 3 that can be used are, for instance, thyristor current changer bridges when a three-phase grid serves as the source of energy, or else choppers when a direct current serves as the source of energy. The type and envisaged objective of this controlling of the means 3 will be described below.

The current generated by the generator 1 is subsequently fed to a frequency converter 9. This frequency converter is a so-called static frequency converter. In order to be able to carry out the regulation of the conversion—which will be described below—means are advantageously provided upstream from the frequency converter to measure the current strength and the voltage of the alternating current and to transmit the corresponding measured values to the control unit 6.

The frequency converter 9 comprises three parts, that is to say, a rectifier 4, an inverter 5 and a direct current stage 10. The rectifier 4 carries out the conversion of the alternating current of the generator 1 into a direct current at a frequency $f_{Gen}$. This direct current is subsequently converted in an inverter 5 into the frequency $f_{Grid}$ that is adapted to the grid.

In the case of a two-stage converter with basic frequency clocking, the ratio of alternating voltage to direct voltage is constant.

In the case of a three-stage converter with basic frequency clocking, the ratio of alternating voltage to direct voltage can be set at will. However, harmonic waves are generated (as is also the case with the two-stage converter). One of the advantages of the three-stage converter in comparison to the two-stage converter is the possibility of reducing the harmonic waves and obtaining a relatively good waveform. This objective limits the adjustability of the voltage ratio to a small range whose magnitude depends on the magnitude of the permitted harmonic waves. The voltage regulation is then carried out in a combined operation by means of the converter and the generator excitation.

In order to attain unhampered power regulation, both the amplitude and the phase angle of the voltage have to be set. The effective power is mainly influenced by the phase angle between the generator voltage and the voltage generated by the controlled rectifier (or between the grid voltage and the voltage generated by the controlled inverter). The reactive power (and thus the power factor) is mainly influenced by the ratio of the amplitudes of the generator voltage and the voltage generated by the controlled rectifier (or of the grid voltage and the voltage generated by the controlled inverter).

The concrete example of a rectifier 4 used in the embodiment is a three-stage pulse rectifier. Such a pulse rectifier is disclosed, for example, in "Convertisseurs statiques", Hansruedi Bühler, page 302 ff., published by Presses Polytechniques et Universitaires Romandes, 1991, and is thus known to the person skilled in the art. Each of the three phases provided by the generator 1 is rectified by means of an appropriate rectifier circuit, as depicted in FIG. 1. Such a pulse rectifier employs semiconductor components such as, for instance, GTOs, IGBTs, MOSFETs or IGCTs as the power switch.

The rectifier 4 is operated with so-called basic frequency clocking, that is to say, with a method in which the switching losses or commutation losses that occur are minimal (in this context, see page 147 ff. loc. cit.). A drawback of this switching arrangement is only that the voltage ratio of the input voltage of the generator ($U_{Gen}$) to the direct current voltage ($U_{Direct}$) is constant and cannot be regulated without changing the switching arrangement and without the associated switching losses.

The direct voltage provided in the case of such a three-stage rectification—at which voltage each of the three levels is separated from each other via capacitors—is subsequently employed as the input for an inverter 5 that is configured similarly although arranged in mirror image so to speak. A pulse inverter is used, in turn, as the inverter 5, as has already been described in conjunction with the rectifier 4. This pulse inverter is likewise operated in its basic frequency clocking in order to keep switching losses to a minimum. In a corresponding manner, however, the result here is also a constant ratio of the direct current voltage ($U_{Direct}$) to the alternating-current voltage ($U_{Grid}$) on the grid side.

The alternating voltage in three phases provided by the inverter 5 is subsequently fed into the grid 8, optionally via a transformer 7. Once again, in order to be able to optimally execute the regulation according to the invention, it is advantageous to carry out a voltage measurement 11 or a current strength measurement 17 downstream from the inverter 5 and to make the appertaining measured values available to the control unit 6.

The described combination of two switching elements arranged in mirror image, namely, the pulse inverter and the pulse rectifier 5, 4, brings about a constant ratio of the input voltage to the output voltage when both are operated in their basic frequency clocking.

$$U_{Gen}/U_{Grid} = \text{const.}$$

In other words, with such a frequency converter 9, any desired ratios of the frequencies of the input ($f_{Gen}$) to the output ($f_{Grid}$) can be set, although the effective and reactive power fed into the grid 8 cannot be regulated at will owing to the fixed ratio of the voltages.

In order to nevertheless be able to feed the maximum possible power from the source of energy P into the grid 8 at an optimal power factor, the procedure according to the invention is now such that the ratio of the voltages is set indirectly via the adjustment of the current that is fed to the excitation coil 2. This regulation, which is possible via the means 3, causes the excitation field generated by the excitation coil 2 and thus the voltage induced in the stator windings 16 to be regulated. Here, this control is carried out by the unit 6 which, for this purpose, can employ the data on the voltage and on the current strength or its phase angles and frequencies that was obtained from the measuring devices used for the voltage measurement 11 and for the current measurement 17.

Thus, in spite of the fixed ratio of the voltages in the static frequency converter 9, the desired power can be delivered to the grid 8 at the desired power factor at all times. This type of regulation has, among other things, the huge advantage that changes in the power fed into the grid 8 are possible on a very short time scale. The relatively good waveform of a three-stage rectifier or inverter allows a frequency converter 9 structured on this basis to be employed as a direct connection between the generator 1 and the grid 8. If necessary, as already mentioned, a transformer 7 can be additionally employed between the frequency converter 9 and the grid 8.

Figure 2:
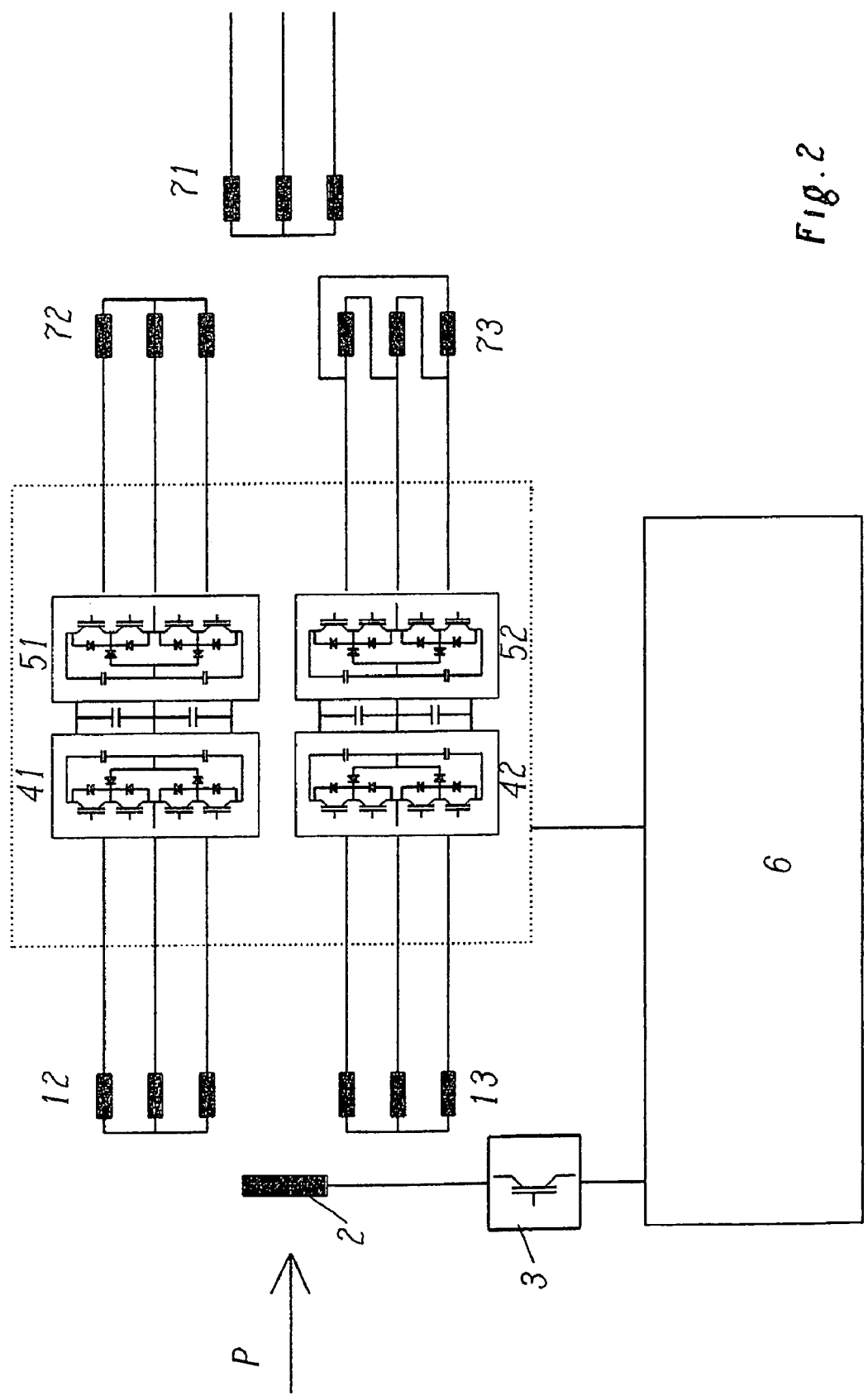
FIG. 2 a schematic depiction according to FIG. 1, whereby the stator of the generator is configured with two groups of windings.

As shown in FIG. 2, the generator can also be a generator having several groups of stator windings. FIG. 2 shows a generator 1 with two groups of stator windings 12 and 13. The corresponding three phases of each group of windings are subsequently fed individually to a frequency inverter. In other words, the three phases of the first group of stator windings 12 are fed to a first rectifier stage 41 and subsequently matched to the frequency needed for the grid 8 in an inverter stage 51. In a separate circuit, the three phases of the second group of stator windings 13 are fed to a first rectifier stage 42 and subsequently likewise matched to the frequency needed for the grid in an inverter stage 52. Afterwards, the three phases of the first group and of the second group are connected by means of the transformer coil 71 to the grid via transformer coils 72 and 73, respectively. In order to ensure an optimal connection, in an advantageous manner, one of the groups is configured as a star connection and the other group as a delta connection.

Figure 3:
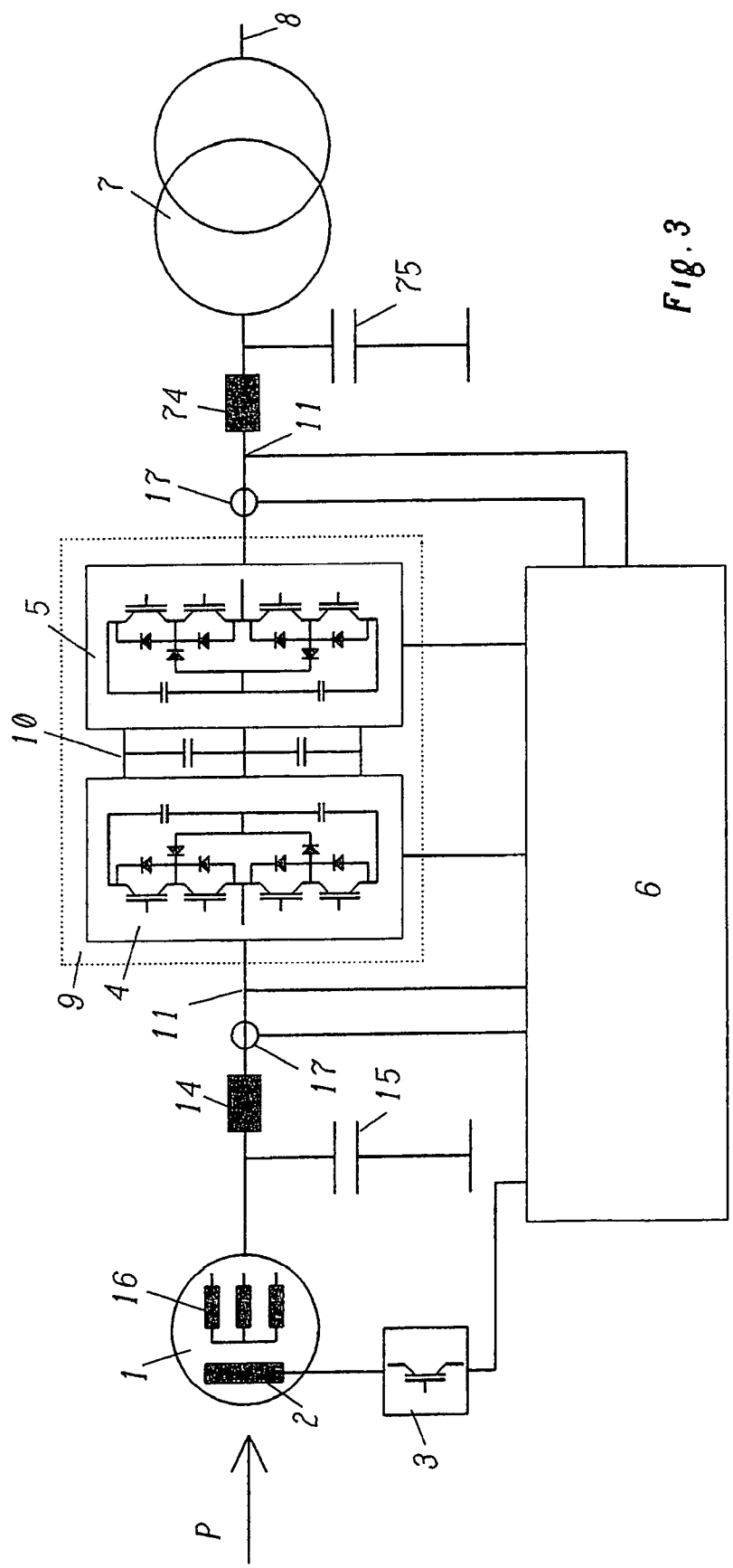
FIG. 3 a schematic depiction according to FIG. 1, whereby filters that serve to attenuate harmonics are added.

If the configuration of either the generator 1 or the grid 8 makes this necessary, it is also possible to employ appropriate filters to eliminate or attenuate harmonic multiples of the type that typically occur with the proposed rectifier 4 and with the proposed inverter 5 in their basic frequency clocking. This is depicted in FIG. 3, where a low-pass is provided on the side of the generator 1 via a choke coil 14 in line and a capacitor 15 to the ground. Thus, undesired frequency components which could interfere with the generator 1 and cause, for instance, torque fluctuations, can be eliminated. On the other hand, by means of an appropriate low-pass arranged on the side of the grid 8 and made up of a choke coil 74 in line and a capacitor 75 to the ground, undesired frequency components in the direction of the grid 8 can be reduced or even eliminated. Thus, solitary operation or stand-alone operation is possible analogously to the so-called uninterruptible power supplies (UPS).

The invention claimed is:

1. A method for adapting an alternating current and an alternating voltage generated by a generator having at least one excitation coil to a grid, the method comprising:
   providing a static frequency converter having a first voltage; and
   controlling power being fed to into the grid using a regulating device by regulating a strength of an excitation field generated by the excitation coil and regulating a phase angle between the first voltage of the frequency converter and one of a second voltage of the generator and a third voltage of the grid.

2. The method according to claim 1, wherein the static frequency converter includes a rectifier, an inverter and a direct current stage disposed between the rectifier and the inverter.

3. The method according to claim 1, wherein the static frequency converter includes at least one of a controlled rectifier in basic frequency clocking and a controlled inverter in basic frequency clocking.

4. The method according to claim 3, wherein the controlled rectifier is a three-stage rectifier and the controlled inverter is a three-stage inverter, both operated in basic frequency clocking.

5. The method according to claim 1, wherein the static frequency converter includes switched thyristors.

6. The method according to claim 5, wherein the switched thyristors include at least one of GTOs, IGBTs, MOSFETs or IGCTs.

7. The method according to claim 1, further comprising:
   measuring at least one of a voltage and a current strength at a location; and
   appropriately actuating the regulating device using a control unit for regulating the strength of the excitation filed, so as to adapt an amplitude of the alternating current fed into the grid.

8. The method according to claim 7, wherein the location is one of upstream and downstream of the static frequency converter.

9. The method according to claim 3, wherein the regulating of the phase angle includes appropriately actuating at least one of a phase angle between the second voltage and an alternating voltage generated by the controlled rectifier and a phase angle between the third voltage and an alternating voltage generated by the controlled inverter.

10. The method according to claim 1, further comprising at least one of attenuating and eliminating frequency components that diverge from a basic frequency upstream and/or downstream of the static frequency converter.

11. The method according to claim 1, wherein the generator has two or more groups of stator windings, each generating an individual alternating voltage, and further comprising converting each individual alternating voltage using a respective individual static frequency converter unit.

12. The method according to claim 11, wherein the generator has a first and a second group of stator windings, each having three phases and wherein a connection to the grid is established downstream from the static frequency converter using a transformer, wherein a first group of transformer coils corresponding to the first group of stator windings is arranged in a star connection and wherein a second group of transformer coils corresponding to the second group of stator windings is arranged in a delta connection.

13. The method according to claim 1, wherein the regulating device includes a thyristor current changer bridge and wherein power is obtained from a three-phase grid.

14. The method according to claim 1, wherein the regulating device includes a chopper and wherein the power is obtained in the form of a direct current.

15. The method as recited in claim 1, wherein the generator is a turbine generator and further comprising:
   feeding energy from the grid using the frequency converter to the generator; and
   varying the voltage and frequency in the frequency converter from zero to a rated value so as to accelerate the turbine generator to a minimum speed needed for energy production.

16. A device for adapting an alternating current and an alternating voltage for a grid, the device comprising:
   a generator having at least one excitation coil:
   a regulating device configured to adapt an amplitude of the alternating current to requirements of the grid, the generator being regulable by the regulating device;
   a static frequency converter including at least one controlled rectifier in basic frequency clocking and at least one controlled inverter in basic frequency clocking; and
   at least one control unit configured to control at least one of the generator, the regulating device and the static frequency converter.

* * * * *